US010158416B1

(12) United States Patent
Cooper et al.

(10) Patent No.: US 10,158,416 B1
(45) Date of Patent: Dec. 18, 2018

(54) UNATTENDED BLACK SIDE DATA LINK RELAY

(71) Applicant: BAE Systems Information and Electronic Systems Integration Inc., Nashua, NH (US)

(72) Inventors: David A Cooper, New York, NY (US); John H Chongoushian, Emerson, NJ (US); Bruce M Eteson, Hackettstown, NJ (US); Jeffrey P Pincus, Emerson, NJ (US); John A Tranquilli, Jr., Amherst, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/827,408

(22) Filed: Nov. 30, 2017

(51) Int. Cl.
*H04B 15/00* (2006.01)
*H04B 7/14* (2006.01)
*H04W 12/02* (2009.01)
*H04L 25/02* (2006.01)

(52) U.S. Cl.
CPC .............. *H04B 7/14* (2013.01); *H04B 15/00* (2013.01); *H04L 25/0202* (2013.01); *H04W 12/02* (2013.01)

(58) Field of Classification Search
CPC . H04B 7/14; H04B 7/15; H04B 7/155; H04B 15/00; H04W 12/02; H04L 25/02; H04L 25/0202

USPC ....... 375/130, 132, 133, 135, 146, 259, 260, 375/295
See application file for complete search history.

(56) References Cited

U.S. PATENT DOCUMENTS 5,817,020 A * 10/1998 Ishii ..................... A61B 8/0875
600/437
2010/0061280 A1* 3/2010 Lee ......................... H04L 7/027
370/280

* cited by examiner

Primary Examiner — Siu Lee
(74) Attorney, Agent, or Firm — Maine Cernota & Rardin; Scott J. Asmus (57) ABSTRACT

An unattended apparatus and method for isolating and relaying secure communications under adverse circumstances without awareness of encryption keys uses known and/or inferred characteristics of received transmissions to identify, isolate, and retransmit only friendly communications without decryption or re-encryption, and in embodiments also without awareness of applicable TRANSEC algorithms and keys. A channelizer digitizes energy received within a bandwidth of interest, which is then analyzed to detect chip timing, identify and demodulate pulses, and assemble secure messages for retransmission. In embodiments, the retransmissions use the original frequencies and TRANSEC parameters, and/or otherwise adhere to applicable TRANSEC and MSEC constraints so that the relayed messages are accepted by intended recipients. Embodiments provide interoperability with existing secure communications such as Link 16 and CDL. In embodiments relay nodes communicate via an out-of-band transport to determine which link has the best reception and which should retransmit a message.

23 Claims, 6 Drawing Sheets

UNATTENDED BLACK SIDE DATA LINK RELAY

FIELD

The disclosure relates to telecommunications, and more particularly, to relaying of secure communications.

BACKGROUND

One of the requirements for virtually any communication system is the ability to operate reliably over an entire geographical region of interest, despite the presence of various sources of noise, naturally occurring interference, and signal obstructions. In the case of military communication systems, and also for some civilian communication systems, the challenge of providing reliable communications can be greatly increased due to adverse circumstances, such as when operating in in Anti-Access Area Denial (A2AD) regions where communications are contested due to the presence of adversarial signals such as adversarial communications, navigation, and jamming signals. As a result, the geographic range over which transmission can be reliably received can be limited. In some instances, the communication range can be expanded simply by increasing transmission powers. However, this approach can be expensive, and can suffer from terrain obstructions and shadowing, and from radio horizon limitations. Accordingly, it is sometimes necessary to relay communications so as to communicate over an entire region of interest.

When operating in A2AD regions, it is also typically necessary that at least some communications be rendered difficult or impossible for adversaries to intercept and/or interpret. Current approaches that are used to meet these COMSEC (communications security) requirements include various forms of cryptography, referred to as message security or MSEC, as well as transmission security, referred to as TSEC or TRANSEC. TRANSEC typically includes pseudorandom frequency hopping and/or signal covers, wherein a required pseudorandom sequence generation is controlled by a cryptographic algorithm and key. Examples of these approaches include Link 16, Tactical Targeting Networking Technology (TTNT) and Common Data Link (CDL).

One approach that is sometimes used for relaying secure communications is to implement attended relay nodes within the communications network, whereby the relay nodes are "key-aware," i.e. aware of the encryption and TRANSEC algorithms and keys that are currently in use, and are able to receive, interpret, re-encode, and retransmit selected communications using protocols that satisfy the expectations of the intended recipients. Typically, these key-aware nodes implement full radio systems that include both Red (unsecure) and Black (secure) portions to provide for the ability to extend the communication range by receiving and retransmitting the desired communication data. Often, active nodes such as military aircraft or ground vehicles that are the recipients of some communications in the network also serve as key-aware relay nodes to ensure that other messages are received by more distant recipients. This approach has the advantage that only desired communications are relayed, while noise, jamming signals, and adversary communications are not retransmitted.

However, this attended, key-aware relay approach requires that the relaying nodes be manned, which can limit the distribution of resources and/or require deployment of additional manned resources so as to provide the needed geographical coverage. Furthermore, deploying additional manned resources for the sole purpose of relaying messages can put additional personnel in harm's way, and also carries the added security risk of requiring a widened distribution of the algorithm and key information that enables detection and interpretation of sensitive communications.

The risk of compromising sensitive information becomes even greater if unattended key-aware relays are implemented, due to the danger of tampering. In additional, unattended relay nodes typically impose significant size, weight, power and cost burdens. Furthermore, the need to periodically update the key and algorithm information in unattended key-aware relay nodes can be problematic.

Another approach is to implement repeaters that do not have access to encryption keys, but are TRANSEC aware, i.e. do have the TRANSEC algorithm and key information pertaining to the secure messages. Accordingly, these repeater nodes are able to receive secure messages, error correct them, and retransmit them without decrypting their contents, either on the same or on different frequencies while maintaining TRANSEC compatibility with the intended receivers of the messages. However, this approach can increase the risk of compromising the TRANSEC algorithms and keys.

Yet another approach that is sometimes used is to deploy unattended "same frequency" repeaters that are "TRANSEC deprived," i.e. deprived access to both the cryptographic keys and the TRANSEC algorithms and keys. These TRANSEC-deprived repeaters merely retransmit without modification everything that is received within a bandwidth of interest. This approach has the advantage of boosting signal strength, and thereby signal range, without significantly increasing the security risk, because these "same frequency" relays do not possess the key and algorithm information that is required to interpret sensitive communications.

However, this "same frequency" approach has the disadvantage that jamming signals, adversary communications, noise, and all other sources of interference are retransmitted along with the desired signals. For frequency-hopped signals, this disadvantage is compounded due to the total operating band to be covered and the difficulty of amplifying the desired signal channel along with all of the unused channels at each instant. Accordingly, while the signal amplitude is increased, the signal to noise-and-interference ratio remains the same or increases. Also, this approach is subject to multiple technical issues that include reaching a maximum amount of RF gain before feedback oscillations occur.

What is needed, therefore, is an unattended apparatus and method for relaying secure communications under adverse circumstances, such as in A2AD environments, while minimizing any simultaneous relaying of noise, interference, and undesirable signals, with no significant increase in security risk, and in a format that will be accepted by the intended recipient.

SUMMARY

An unattended apparatus and method are disclosed for relaying secure communications under adverse circumstances, such as in A2AD environments, while minimizing any simultaneous relaying of noise, interference, and undesirable signals. Security risks are minimized because the apparatus and method do not have access to the encryption keys that are being used for transmission of the secure communications. In some embodiments, the apparatus and method are aware of the TRANSEC algorithms and keys that are in use, while in other embodiments the apparatus an method are TRANSEC-deprived, i.e. do not have access to the TRANSEC algorithms and methods that are in use. Embodiments relay the secure communications in a format that will be accepted by the intended recipient using unmodified, incumbent protocols.

In embodiments, the disclosed apparatus and method uses known (predetermined) and/or inferred (blind detection) characteristics of received transmissions to identify the arrival of a message, ascertain its exact timing and the frequency or frequencies used, and then retransmit the received message using the original transmission frequency or frequencies and TRANSEC parameters.

In embodiments, the message transmission characteristics that are known a priori to the apparatus and/or derived/inferred by the apparatus so as to perform the relay include:

Modulation type (e.g., BPSK, MSK, QPSK)
Chipping rate
Pulse period
Pulse width
Pulse spacing
Pulse repetition patterns
RF spectrum used
Time slot duration
Channel bandwidth and spacing The disclosed apparatus includes a channelizer that is able to digitize all of the radio frequency energy that is received within the bandwidth over which the secure communications are transmitted. In order to support black-side relay of desired communication signals, the received information is analyzed, without any awareness of the encryption algorithms and keys that are currently in use, so as to detect, identify and isolate blue force (i.e. friendly) signals from within an RF environment that may also include neutral communication and navigation signals, as well as adversarial communication, navigation and jamming signals. In some embodiments, the apparatus is aware of the TRANSEC algorithms and keys that are in use, and is able to use this information to identify and isolate the blue force communications, to perform error correction on the blue force communications, and to retransmit the blue force communications with TRANSEC parameters that will be accepted by the intended recipient and will not cause rejection due to exceeding allowed transmission delays. In other embodiments, this analysis proceeds without awareness of the TRANSEC algorithms and keys that are in use.

This identification and isolation of the desired "blue force' signals is accomplished without knowledge of the encryption keys by recognizing groups of pulses within the received data that match the general structures and features of the communication protocols that are known to be in use by the secure communications, such as Link 16 or CDL. These features include the modulation types, pulse characteristics, RF levels, pulse delays, pulse repetition patterns, and other key attributes of the secure communication protocols. Embodiments further detect pulse power levels and/or approximate directions and distances from which signals are received, and use this information to further support the identification and isolation process.

In embodiments, interoperability with existing protocols is maintained by adhering to the TRANSEC and MSEC constraints that are in effect. In particular, rejection of the relayed messages due to delayed transmission security is avoided by automatically detecting the waveform segments (Sync, Data, Guard) in received signals and relaying the relevant portion in a delayed time slot, thereby using both late TSEC and/or MSEC to understand and compensate for the delays. Accordingly, interoperability with existing secure communication systems such as Link 16 and CDL is maintained.

In a first general aspect of the disclosure, the apparatus is arranged in a master-slave configuration, wherein a master sub-system is configured for both red and black communications, while one or more slave sub-systems are configured only for relaying black communications. In some of these embodiments, the red (non-encrypted) communications are treated identically with the black (encrypted) communications. In other embodiments, the extracted messages are reviewed to detect non-encrypted messages, and the content of these "red" messages is reviewed for further error correction.

In a second general aspect of the disclosure, the apparatus is configured only for relaying black communications, whereby, in embodiments, the relaying includes TRANSEC frequency remapping, time slot jitter, and/or pseudo-noise cover stripping, so that the retransmitted signals are fully interoperable with existing, unmodified communication systems. In a third general aspect of the disclosure, the apparatus is configured only for relaying black communications, and does not include any TRANSEC or MSEC interoperability features.

In embodiments, the analysis of the received data and the identification of blue signals includes application of multiple layers of signal isolation, analysis, and characterization, some of which are spatially based and others of which are based on the properties of the received signals. In embodiments, a hierarchical estimation and a time, frequency, and modulation analysis process is applied to the set of signals that pass this initial isolation, whereby parameter estimation is simultaneously performed to identify individual pulses on multiple channels. The results of the parameter estimation and pulse identification are then stored and used to perform statistical and structural assessments at the frame level to enable assembly of the pulses into messages, and classification of identified transmissions as blue force communications, in contrast with all of the other potential transmission types.

A first general aspect of the present disclosure is a method for unattended relaying of a secure radio frequency communication from within an RF bandwidth of interest, without decrypting of the communication and without re-encrypting of the communication. The disclosed method includes:

receiving and digitizing radio frequency energy present within the RF bandwidth of interest at a relay location;

identifying a plurality of signal pulses present within the digitized energy, wherein the plurality of signal pulses have general structures and features of the secure radio frequency communication;

extracting a group of desired pulses from among the plurality of signal pulses, wherein the desired pulses have measured properties that correspond with expected properties of the secure radio frequency communication; and retransmitting the group of desired pulses;

wherein the receiving, identifying, extracting, and retransmitting are done without decryption or re-encryption of the secure radio frequency communication.

In embodiments of the first general aspect, the measured properties of the signal pulses that correspond with expected properties include estimated transmission source distances.

In any of the above embodiments of the first general aspect, the measured properties of the signal pulses that correspond with expected properties can include estimated directions from which the signal pulses were received.

In any of the above embodiments of the first general aspect, the measured properties of the signal pulses that correspond with expected properties include pulse durations and spacing.

In any of the above embodiments of the first general aspect, the measured properties of the signal pulses that correspond with expected properties can include relationships between pulse timing and network time references;

In any of the above embodiments of the first general aspect, the measured properties of the signal pulses that correspond with expected properties can include at least one modulation characteristic of the signal pulses. In some of these embodiments, the at least one modulation characteristic includes at least one of type of modulation, baud rate of the modulation, and shaping of the modulation.

In any of the above embodiments of the first general aspect, the measured properties of the signal pulses that correspond with expected properties can include analysis of a frequency occupancy of the signal pulses. In some of these embodiments, the analysis of the frequency occupancy includes an analysis according to at least one of channelization of the signal pulses, hop patterns of the signal pulses, and structures of the signal pulses. And in some of these embodiments the analysis according to structures of the signal pulses includes an analysis according to relative patterns of sync and data pulses.

In any of the above embodiments of the first general aspect, the group of desired pulses can be retransmitted with adherence to applicable TRANSEC and MSEC constraints. In some of these embodiments, the method further comprises automatically detecting applicable waveform segments of the group of desired pulses, and relaying relevant portions in a delayed time slot, where the applicable waveform segments can include at least one of sync segments, data segments, and guard segments. In any of these embodiments the method can include at least one of TRANSEC frequency remapping, time slot jitter, and pseudo-noise cover stripping.

In any of the above embodiments of the first general aspect, retransmitting the group of desired pulses can include providing the group of desired pulses to a second unattended relay node using an out-of-band transport link for transmission of the desired pulses by the second unattended relay node.

A second general aspect of the present disclosure is an apparatus for unattended relaying of a secure radio frequency communication from within an RF bandwidth of interest, without decrypting of the communication and without re-encrypting of the communication. The apparatus includes:

a receiver configured to receive and digitize as received data radio frequency energy present within the RF bandwidth of interest;

a channelizer configured to distribute the received data into channelized data;

a pulse detector configured to recognize pulses included in the channelized data;

a message detector configured to determine if a message is present in the channelized data;

a chip detector configured to determine chip timing of a message present in the channelized data;

a demodulator configured to determine boundaries of data chips according to the chip timing of the message and extract digitized data from each of the recognized pulses;

a message assembler configured to assemble a message according to the digitized data extracted from the pulses; and a transmitter configured to retransmit the assembled message.

Embodiments of the second general aspect further include an out-of-band node-to-node transport interface configured to communicate messages and control information between the apparatus and at least one other unattended relay node.

Any of the above embodiments of the second general aspect can further include a time reference that is synchronized to a time base applicable to the secure radio frequency communication.

In any of the above embodiments of the second general aspect, for each pulse that is distributed among a plurality of frequencies, the demodulator can be configured to:

cycle through each output of the channelizer;

demodulate the pulse;

determine phase and magnitude errors of the demodulated pulse; and assign a demodulation score to the demodulated pulse.

In some of these embodiments, after all pulses have been demodulated for each of a plurality of pulse periods, the message assembler is configured to assemble the message using the demodulated pulses for each of the pulse periods having the highest demodulation score.

And in any of the above embodiments of the second general aspect, the apparatus can be configured to tag each demodulated pulse with a pulse location and the channelizer ID that are used to determine a frequency for the retransmission of the assembled message.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an unattended apparatus and method for relaying secure communications under adverse circumstances, such as in A2AD environments, while minimizing any simultaneous relaying of noise, interference, and undesirable signals, with minimal increase in security risk, and in embodiments without introducing signal delays that exceed transmission protocol limits. As a result, the capacity of the communication system is increased, and the system power consumption is decreased.

Figure 1:
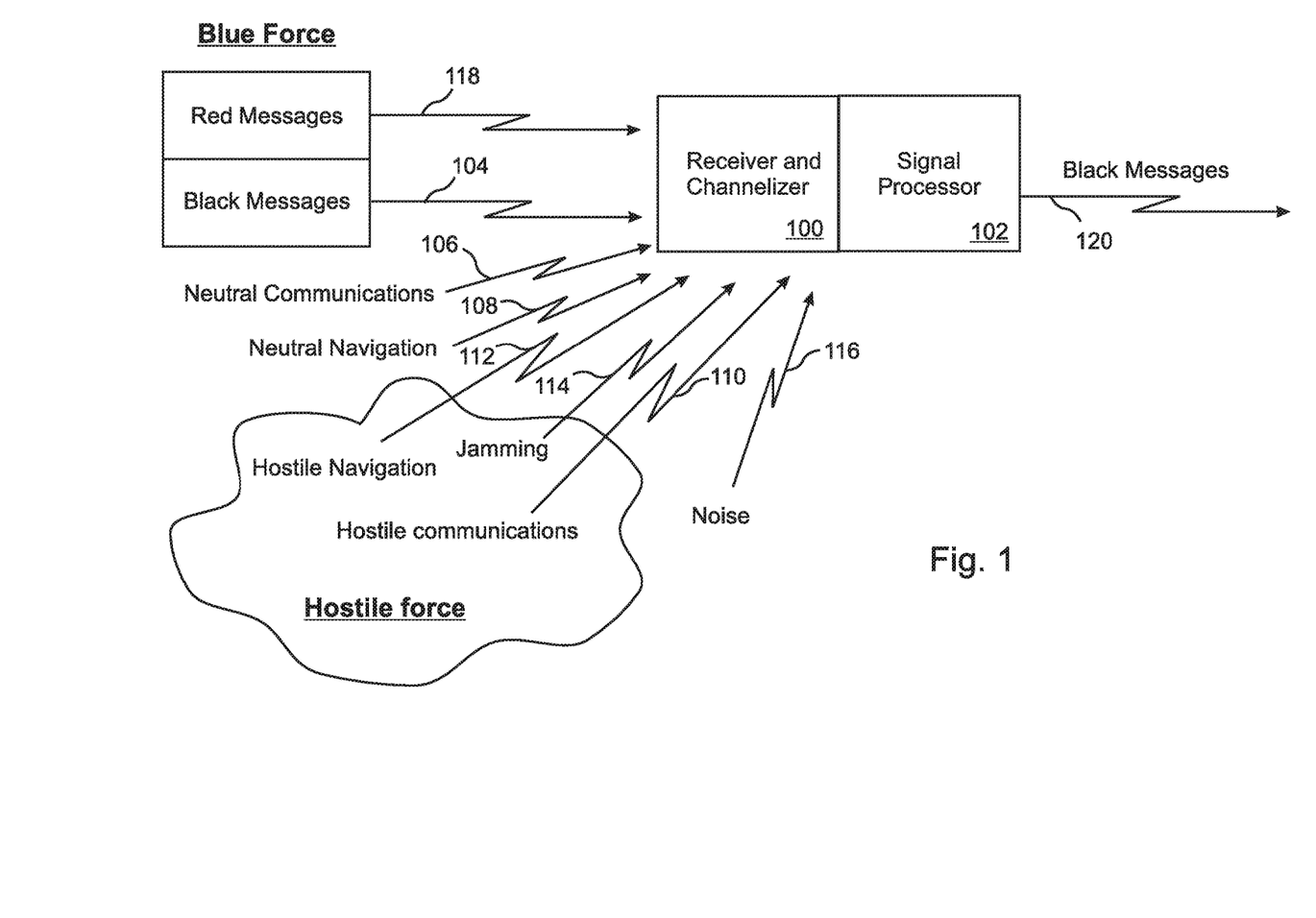
FIG. 1 is a block diagram illustrating a single channel apparatus embodiment of the present disclosure.

With reference to FIG. 1, the disclosed apparatus comprises a receiving "front end" 100 that includes a receiver and a channelizer that are able to receive and digitize all of the radio frequency energy that is present within the bandwidth that is being used to transmit blue messages. The front end 100 may include amplifiers, filters, downconverters, and/or analog-to-digital converters as appropriate. The RF front end 100 in some embodiments limits the data to energy received within the bandwidth of interest by using lowpass, bandpass, and/or highpass filters, along with the RF front end elements. In embodiments, certain signals at low power levels are not processed, such as those below the noise floor of the system. At least one antenna (not shown) is coupled to the front end 100 and receives the red messages 118 and black messages 104 as well as any noise 116, hostile force signals 110, 112, 114, and various neutral communications 106 and neutral navigation 108.

So as to support the received communication signals, including the black messages 104, the apparatus further includes a signal processor 102 that analyzes the received and digitized information from the front end 100, without any interpretation or awareness of the encryption keys that are currently in use, so as to detect, identify, and isolate blue force (i.e. friendly) secure signals 104 from within an RF environment that may also include neutral communication 106 and navigation signals 108, as well as adversarial communication 110, navigation 112, and jamming 114 signals, in addition to naturally occurring noise 116. The isolated secure signals 120 are identified as blue force signals and are then relayed to their intended recipients, or to additional relay nodes.

In some embodiments, the TRANSEC algorithms and keys are known to the apparatus, and are used to enhance the identification of the blue force messages, to perform error correction on the blue force messages, and/or to retransmit the identified blue force messages with TRANSEC parameters that will be accepted by the intended recipient of the message without rejection e.g. due to excessive retransmission delay. In other embodiments, the TRANSEC algorithms and keys are not known to the apparatus.

In embodiments, the signal processor 102 performs hierarchical signal processing on the incoming sample stream from the receiver and channelizer 100 by detecting signal pulses that are included in transmissions within the received data, and by analyzing features such as the modulation, power, timing, durations, and pattern of the signal pulses. The multi-layer structures of the received transmissions are assessed using a-priori and inferred knowledge to identify and isolate true friendly communications from neutral or adversarial communications and/or jamming waveforms.

In embodiments, assessing the multi-layer structures of transmissions can include signal separation (via spatial and/or property-based component analysis), statistical analysis of pulse durations and spacing, alignment of timing assessments to known (or inferred) network time references, modulation characterization (including, in embodiments, the types, baud rates, and/or shaping), analysis of frequency occupancy, including channelization, hop patterns and/or structure (e.g. sync vs. data) as compared to known or inferred patterns).

In embodiments, unsecure "red" messages 118 are also detected. In some embodiments, the red messages 118 are treated identically to the black messages 104. In other embodiments, the red messages are identified as such, and their unencrypted content is reviewed against dictionaries and other references for verification of message validity and/or for error correction purposes.

Figure 2:
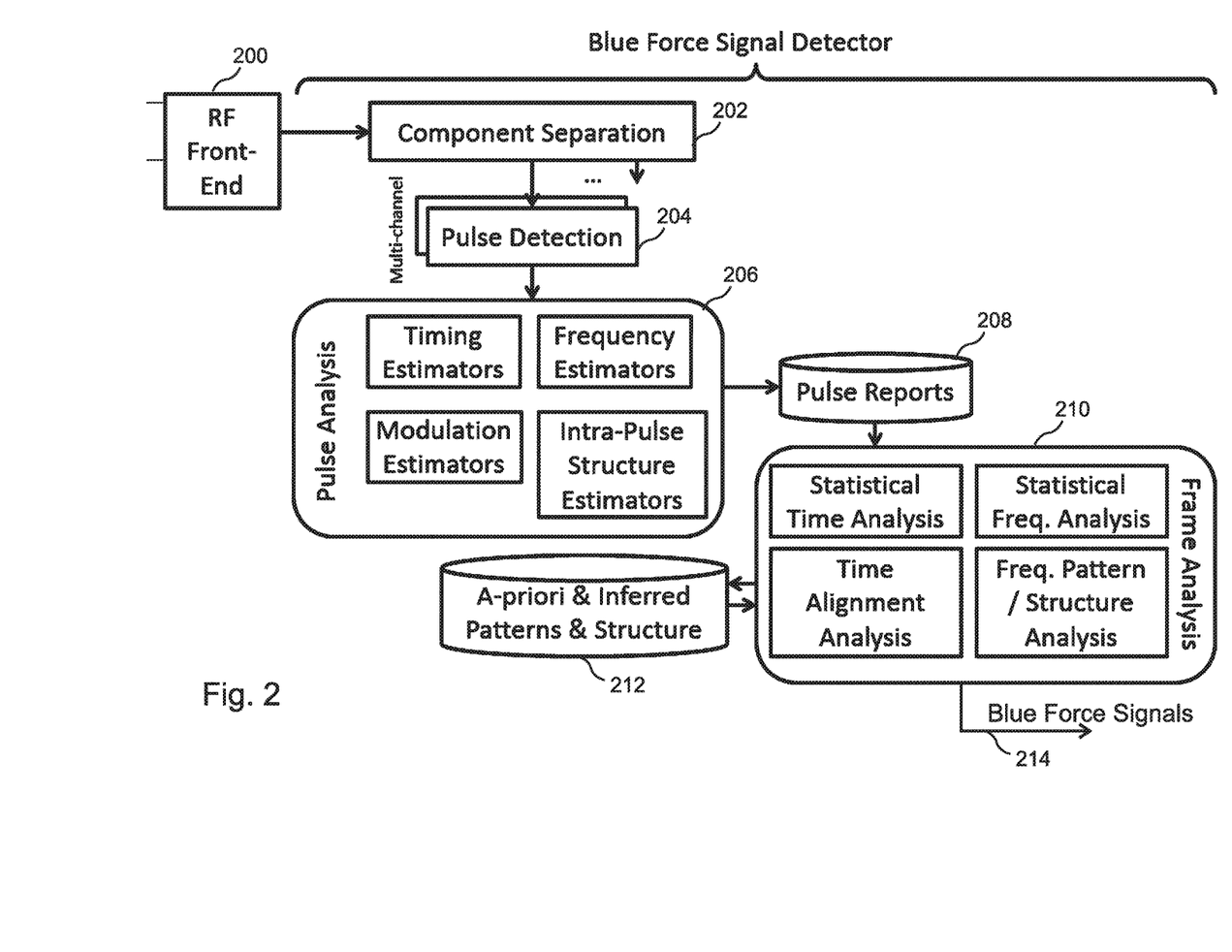
FIG. 2 is a flow diagram illustrating pulse and frame analysis according to a method embodiment of the present disclosure.

With reference to FIG. 2, after receiving and digitizing the full information from the RF front end 200 that is present in the bandwidth of interest, the analysis of the received and digitized data and the identification of blue force signals is accomplished through the application of multiple layers of signal isolation, analysis, and characterization of the digital signals in the signal processor 102. As an initial step, signal pulses are identified and isolated from within the received data. This initial step of component separation and/or isolation 202 can be based at least partly on properties of the received signals themselves. Embodiments further detect approximate directions and distances from which signals are received, and use this information to further support this initial identification and isolation step 202.

After the initial separation/isolation step 202, groups of pulses are detected 204 within the received data that match the general structures and features of the communication protocols that are known to be in use by the secure communications, such as Link 16 or CDL. In this multi-channel pulse detection, groups of possible pulses are identified that have general characteristics indicating that at least some of them may belong to the signals of interest. These general characteristics can include, for example, phase, frequency, duration, spacing, repetition patterns, pulse sequence, power, and the like.

In embodiments, a pulse analysis 206, such as a hierarchical parameter estimation, is then applied to the groups of possible signal pulses that are identified in the pulse detection 204. This parameter estimation, in various embodiments, is based on time, frequency, and modulation analysis, as well as intra-pulse structure estimates, whereby the parameter estimation is simultaneously performed on individual pulses on multiple channels.

The results of the pulse analysis are then stored as pulse reports 208 and are used to perform a frame analysis 210 at the frame level that includes statistical time and frequency analyses, as well as time alignment analysis and frequency pattern structural analysis, according to patterns and structures that are inferred and/or known a-priori to be in use 212, so as to enable classification of transmissions, such as blue force signals 214. In embodiments, the frame analysis 210 provides for isolation of the identified blue force communications 214 from all of the other potential transmission types. In various embodiments, the known or inferred patterns and structures 212 that are used to identify the blue communications include modulation types, pulse characteristics, RF levels, and other key attributes of known secure communication protocols. The output 214 of the frame analysis 210 represents at least the black messages, and in some embodiments also the red messages.

The identification and isolation of the desired "blue force' signals is thereby accomplished without the benefit of knowing the specific cryptographic algorithms and keys that are being used for the black messages, and in some embodiments also without knowing the specific TRANSEC algorithms and keys that are in use.

In embodiments, interoperability with existing protocols is maintained by adhering to the TRANSEC and MSEC constraints that are in effect. In particular, rejection of the relayed messages due to delayed transmission security is avoided by automatically detecting the waveform segments (Sync, Data, Guard) in received signals and relaying the relevant portion in a delayed time slot, thereby using both late TSEC and/or MSEC to understand and compensate for the delays. Accordingly, interoperability with existing secure communication systems such as Link 16 and CDL is maintained.

Figure 3:
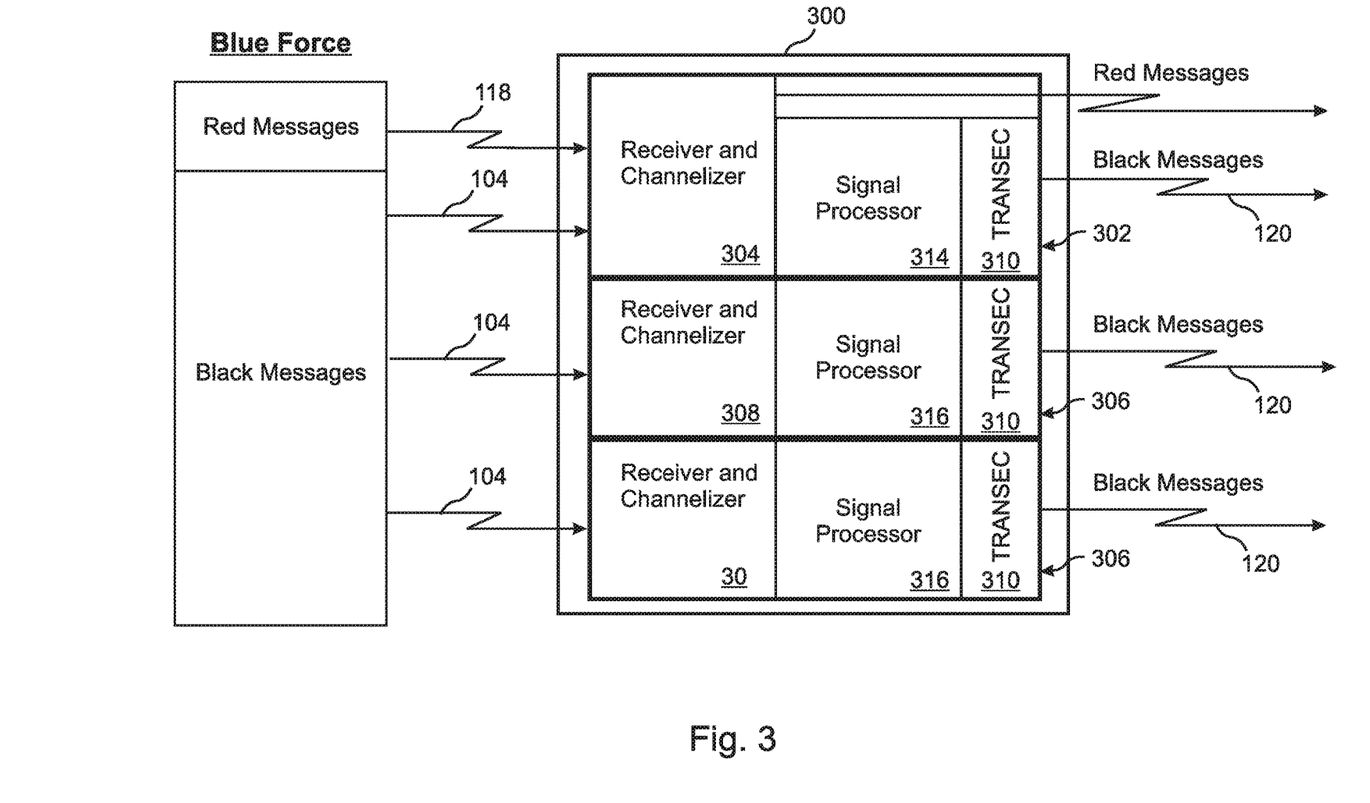
FIG. 3 is a block diagram illustrating a multi-channel apparatus embodiment of the present disclosure.
Figure 4:
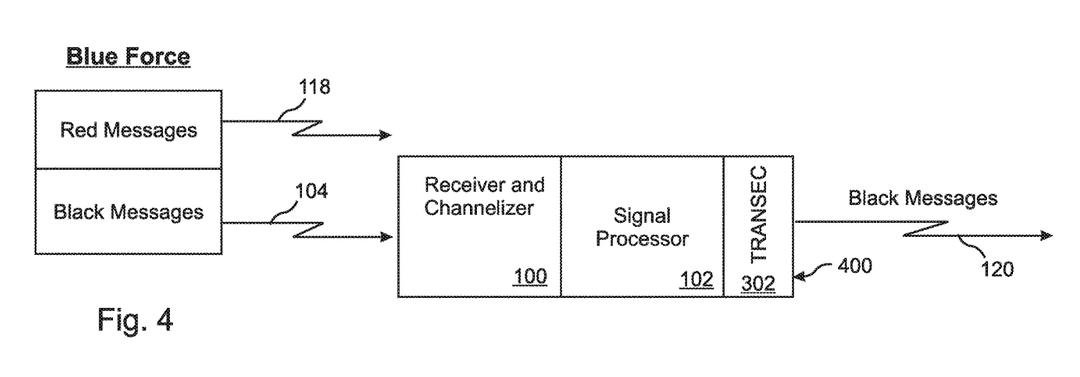
FIG. 4 is a block diagram illustrating a single channel apparatus embodiment of the present disclosure that includes TRANSEC encoding.
Figure 5:
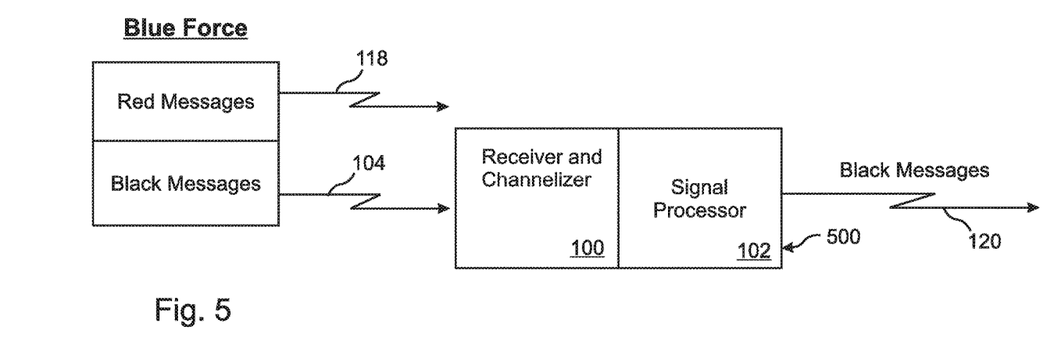
FIG. 5 is a block diagram illustrating a single channel apparatus embodiment of the present disclosure that does not include TRANSEC encoding.

With reference to FIG. 3, in a first general aspect of the disclosure, the apparatus 300 is arranged in a master-slave configuration, wherein a master sub-system 302 having a master receiver and channelizer 304 and signal processor 314 is configured for both red 118 and black 104 communications, while one or more slave sub-systems 306, having slave receivers and channelizers 308, and signal processors 316, are configured only for relaying black communications. In various of these embodiments, TRANSEC frequency remapping time slot jitter, and/or pseudonoise cover stripping are included 310 so that the retransmitted signals 120 are fully interoperable with existing, unmodified communication systems. In some embodiments, the red communications 118 are treated identically to the black communications 104. In other embodiments, the communications are reviewed and compared to dictionaries and other references to identify red messages 118, after which the content of the red messages is reviewed for additional authentication and error correction, With reference to FIG. 4, in a second general aspect of the disclosure, the apparatus 400 is configured only for relaying black communications 104, where the relaying includes TRANSEC frequency remapping, time slot jitter, and/or pseudo-noise ("PN") cover stripping 302. With reference to FIG. 5, in a third general aspect of the disclosure, the apparatus 500 is configured only for relaying black communications 104, and does not include any TRANSEC or MSEC interoperability features.

Figure 6:
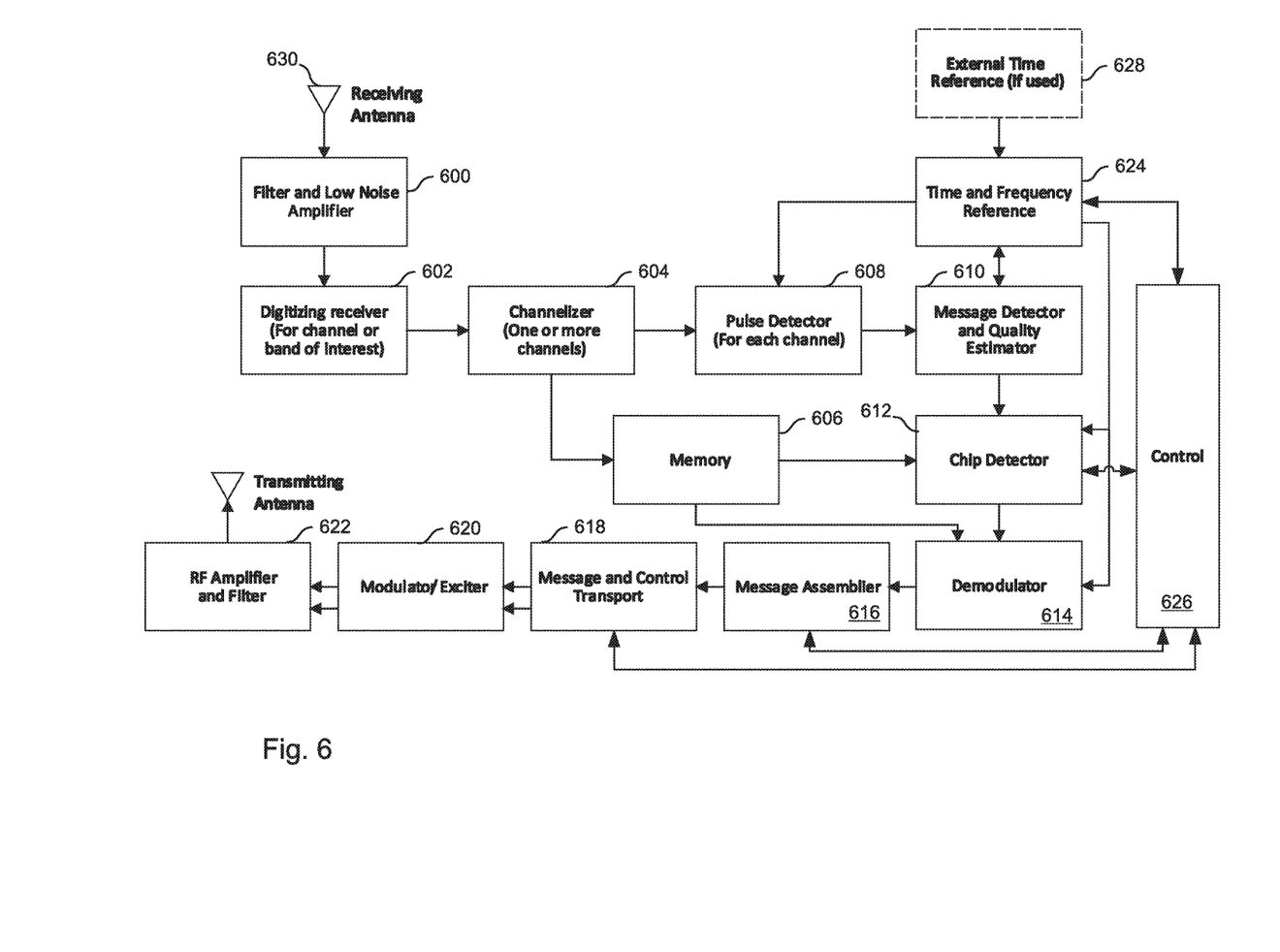
FIG. 6 is a flow diagram illustrating an apparatus embodiment of the present disclosure.

As a more detailed example, an embodiment of the present apparatus and method as applied to detection and relaying of messages transmitted using the Link 16 protocol is illustrated by FIG. 6. The primary elements comprised by the apparatus in this example include:

Receive filter and low noise amplifier 600
Digitizing receiver 602
Channelizer 604
Channel sample buffer memory 606
Pulse detector 608
Message detector 610
Chip detector 612
Demodulator 614
Message assembler 616
Node-to-node transport interface 618
Modulator/exciter 620
RF amplifier 622
Time/frequency reference 624
Control device 626
Optional external time reference 628

According to the illustrated example, the receiving antenna 630 obtains a broad spectrum of signals including the RF signals of interest, which may include both red messages and black messages. The incoming RF signals are subject to filtering and amplification. The filters in embodiments help to isolate the signals that lie within the bandwidth of interest, i.e. the bandwidth within which it is known, or assumed, that the signals of interest are being transmitted. In some embodiments the RF signals are down-converted to IF signals for ease of processing. The analog RF signals are then converted to digital signals by the analog-to-digital conversion included in the digitizing receiver 602. After initialization, the digitizing receiver 602 is configured to digitize all energy received within the bandwidth of interest. The channelizer 604 then "channelizes" the digitized data, i.e. decimates the digitized RF output from the receiver 602 into each of the possible channels of the waveform. In embodiments directed to Link 16, the channelizer 604 is configured into 51 channels that are centered on a Link 16 frequency, with each channel having a bandwidth of 3 MHz.

The pulse detector 608 is an energy detector that samples each channelizer 604 output and detects rising and falling edges of the detected energy for each of the channels. The pulse detector 608 then outputs time tags and channelizer identifications (frequencies) which are provided to the message detector 610.

The message detector and quality estimator 610 uses the pulse timing and frequency information, along with time and frequency reference data 624 and waveform characteristic data from the control 626, to determine if a message is present. For example, embodiments determine if a Link 16 message is present by determining if a correlation of the pulse period, pulse width, and frequency patterns that have been received with the Link 16 message standard is above a specified threshold.

Once a message is determined to be present, the next step is to demodulate a pulse to determine the boundaries of the data chips using the chip detector 612. Using the modulation type and chipping rate from the control function 626, the chip edge detector 612 determines the best sampling point for demodulating all of the chips for the entire message.

Embodiments of the disclosed apparatus include an RF memory 606 which is configured to store RF samples and time tags using a circular buffer. In embodiments, the memory 606 includes sufficient storage capacity to contain multiple data messages.

After a message has been declared as present and the chip timing has been established, the demodulator 614 begins to demodulate the data. For waveforms where the entire pulse is on a single frequency, the demodulator extracts the digitized RF data from the memory 606 between the start and stop times provided by the pulse detector and processes the pulse. For waveforms that frequency hop information on a pulse-by-pulse basis, the demodulator 614 extracts the RF digitized data for a pulse (using the pulse timing information measured earlier) and for each output of the channelizer 604 the demodulator 614 demodulates the chips for all pulse periods using the modulation type and chipping rate initialization data based on the waveform.

Since the hopping pattern is unknown, the demodulator 614 then cycles through each of the channelizer outputs one at a time, determines the phase and magnitude errors of the demodulated pulse, and scores each demodulated pulse. After all of the pulses have been demodulated, the message assembler 616 assembles the digitized data as messages to be transmitted by selecting the demodulated pulses for each pulse period with the highest demodulation scores. The assembled messages from the message assembler 616 are then processed by the message and control transport module 618, where each demodulated pulse (or symbol) is tagged with its pulse location and the channelizer ID. The channelizer ID is used by the Exciter 620 to determine the retransmission frequency.

Once the entire message is assembled, the demodulated data is modulated and up-converted to the appropriate transmit frequency by the modulator/exciter 620. The control function 626 provides the transmit start time to the modulator/exciter 620 via the message and control transport module 618 to ensure that the delay in the re-broadcast is sufficiently synchronized to the network time base and the delay is fixed to a predetermined value. In embodiments, the transmit start time is determined by a network planner (not shown) so as to ensure that sufficient resources are available for reception of the relayed transmission.

Low power level RF pulses are provided to the filter and RF Amplifier 622, which is gated to provide maximum efficiency of the retransmission by the transmitting antenna (not shown).

The control function 626 provides the configuration information for the MODEM, receiver and transmitter functions. The time base 624 does not require an absolute time 628, but is used to allow the relay function to "synchronize" with the time base of the system to which it is relaying.

In summary the presently disclosed apparatus and method enables detection, identification, and isolation of desired communication signals and sync patterns from within an RF-cluttered environment arising, for example, from operation within a contested RF environment. The apparatus is able to operate unattended, and provides significant savings of size, weight, power, and cost. Security risks are not impacted, and the requirement of anti-tampering features is minimized, because the apparatus and method are not key-aware.

Embodiments of the apparatus and method further implement delayed security decoding, which enables them to relay the identified, desired communications at a delayed time while maintaining interoperability with legacy systems.

Figure 7:
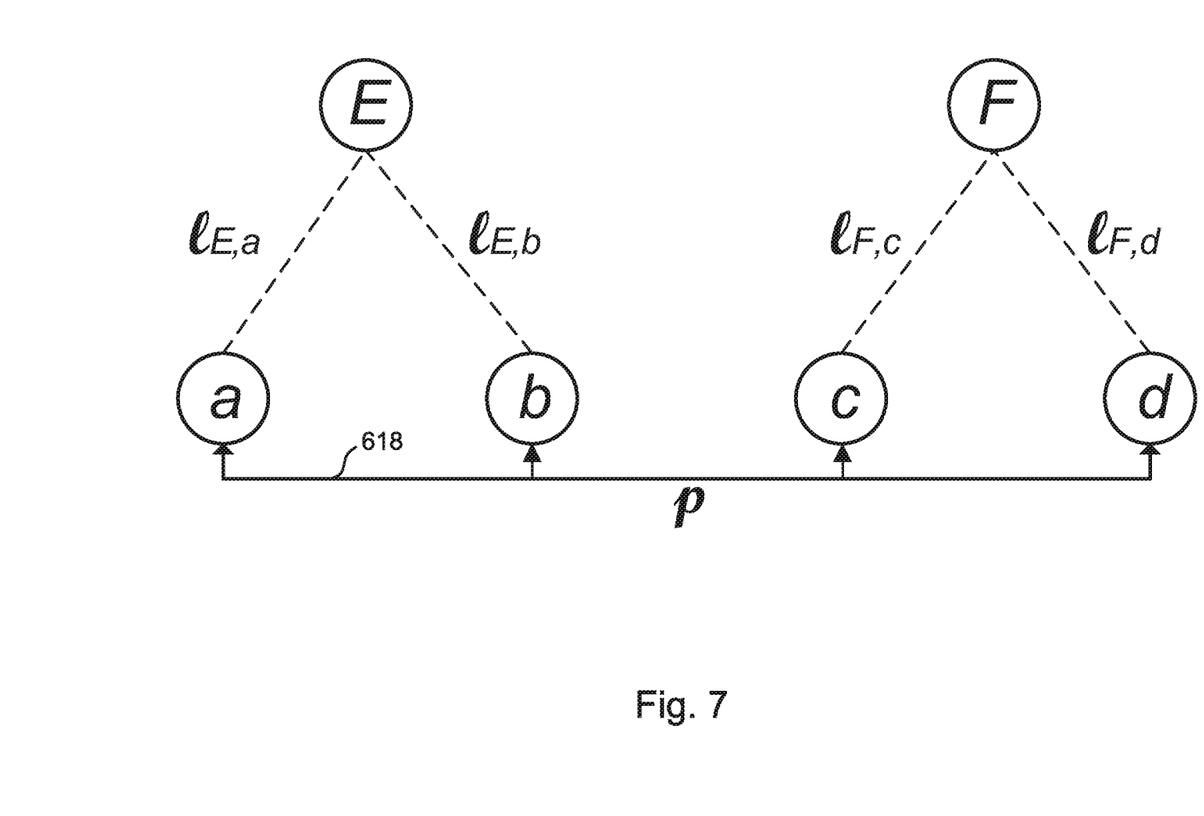
FIG. 7 illustrates out-of-band intercommunication between a plurality of relay nodes according to an embodiment of the present disclosure.

With reference to FIG. 7, embodiments further include "smart networking," whereby the region of interest is mapped into cells that are served by associated relay nodes, so as to maximize the range extension provided by the relay nodes, minimize hardware requirements, and increase robustness in secure communication environments. In the simplified example of FIG. 7, TRANSEC-deprived relay nodes a, b, c, and d are interconnected by out-of-band message and control transport link p 618. TRANSEC-enabled nodes E and F originate messages and receive relayed messages. In the generalized situation depicted in FIG. 7, line-of-sight links exist only for node pairs [E,a], [E,b], [F,c], and [F,d]. The TRANSEC-deprived relay nodes a, b, c, and d detect messages from the TRANSEC-enabled nodes E and F, and exchange information on the control and transport link p 618 to determine which of the TRANSEC-deprived nodes has the best reception. The deprived node having the best reception then forwards the assembled message and control information to the other deprived nodes via the control and transport link p 618 for retransmission by those nodes.

In embodiments, TRANSEC-enabled relay nodes that are aware of the TRANSEC algorithms and keys in use, but not the encryption keys, are located in "safe" cells within the region of interest, whereas TRANSEC-deprived relay nodes are located in cells that are not considered safe.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method for unattended relaying of a secure radio frequency communication from within an RF bandwidth of interest, without decrypting of the communication and without re-encrypting of the communication, the method comprising:
receiving and digitizing radio frequency energy present within the RF bandwidth of interest at a relay location;
identifying a plurality of signal pulses present within the digitized energy, wherein the plurality of signal pulses have general structures and features of the secure radio frequency communication;
extracting a group of desired pulses from among the plurality of signal pulses, wherein the desired pulses have measured properties that correspond with expected properties of the secure radio frequency communication; and
retransmitting the group of desired pulses;
wherein the receiving, identifying, extracting, and retransmitting are done without decryption or re-encryption of the secure radio frequency communication.

2. The method of claim 1, wherein the receiving, identifying, extracting, and retransmitting are done without awareness of any TRANSEC algorithms and keys that were used to transmit the secure radio frequency communication.

3. The method of claim 1, wherein the measured properties of the signal pulses that correspond with expected properties include estimated transmission source distances.

4. The method of claim 1, wherein the measured properties of the signal pulses that correspond with expected properties include estimated directions from which the signal pulses were received.

5. The method of claim 1, wherein the measured properties of the signal pulses that correspond with expected properties include pulse durations and spacing.

6. The method of claim 1, wherein the measured properties of the signal pulses that correspond with expected properties include relationships between pulse timing and network time references.

7. The method of claim 1, wherein the measured properties of the signal pulses that correspond with expected properties include at least one modulation characteristic of the signal pulses.

8. The method of claim 7, wherein the at least one modulation characteristic includes at least one of:
type of modulation;
baud rate of the modulation; and
shaping of the modulation.

9. The method of claim 1, wherein the measured properties of the signal pulses that correspond with expected properties include analysis of a frequency occupancy of the signal pulses.

10. The method of claim 9, wherein the analysis of the frequency occupancy includes an analysis according to at least one of:
channelization of the signal pulses;
hop patterns of the signal pulses; and
structures of the signal pulses.

11. The method of claim 10, wherein the analysis according to structures of the signal pulses includes an analysis according to relative patterns of sync and data pulses.

12. The method of claim 1, wherein the group of desired pulses is retransmitted with adherence to applicable TRANSEC and MSEC constraints.

13. The method of claim 12, wherein the method further comprises automatically detecting applicable waveform segments of the group of desired pulses, and relaying relevant portions in a delayed time slot.

14. The method of claim 13, wherein the applicable waveform segments include at least one of sync segments, data segments, and guard segments.

15. The method of claim 12, wherein the method comprises at least one of TRANSEC frequency remapping, time slot jitter, and pseudo-noise cover stripping.

16. The method of claim 1, wherein retransmitting the group of desired pulses includes providing the group of desired pulses to a second unattended relay node using an out-of-band transport link for transmission of the desired pulses by the second unattended relay node.

17. An apparatus for unattended relaying of a secure radio frequency communication from within an RF bandwidth of interest, without decrypting of the communication and without re-encrypting of the communication, the apparatus comprising:
 a receiver configured to receive and digitize as received data radio frequency energy present within the RF bandwidth of interest;
 a channelizer configured to distribute the received data into channelized data;
 a pulse detector configured to recognize pulses included in the channelized data;
 a message detector configured to determine if a message is present in the channelized data;
 a chip detector configured to determine chip timing of a message present in the channelized data;
 a demodulator configured to determine boundaries of data chips according to the chip timing of the message and extract digitized data from each of the recognized pulses;
 a message assembler configured to assemble a message according to the digitized data extracted from the pulses; and
 a transmitter configured to retransmit the assembled message;
 wherein the apparatus is configured to relay the secure radio frequency communication without decrypting of the secure communication and without re-encrypting of the secure communication.

18. The apparatus of claim 17, wherein the apparatus is configured to relay the secure radio frequency communication without awareness of any TRANSEC algorithms and keys that were used to transmit the secure communication.

19. The apparatus of claim 17, further comprising an out-of-band node-to-node transport interface configured to communicate messages and control information between the apparatus and at least one other unattended relay node.

20. The apparatus of claim 17, further comprising a time reference that is synchronized to a time base applicable to the secure radio frequency communication.

21. The apparatus of claim 17, wherein for each pulse that is distributed among a plurality of frequencies, the demodulator is configured to:
 cycle through each output of the channelizer;
 demodulate the pulse;
 determine phase and magnitude errors of the demodulated pulse; and
 assign a demodulation score to the demodulated pulse.

22. The apparatus of claim 21, wherein after all pulses have been demodulated for each of a plurality of pulse periods, the message assembler is configured to assemble the message using the demodulated pulses for each of the pulse periods having the highest demodulation score.

23. The apparatus of claim 17, wherein the apparatus is configured to tag each demodulated pulse with a pulse location and a channelizer ID that are used to determine a frequency for the retransmission of the assembled message.

* * * * *

UNITED STATES PATENT AND TRADEMARK OFFICE
CERTIFICATE OF CORRECTION

PATENT NO. : 10,158,416 B1
APPLICATION NO. : 15/827408
DATED : December 18, 2018
INVENTOR(S) : Cooper et al.

Page 1 of 1

It is certified that error appears in the above-identified patent and that said Letters Patent is hereby corrected as shown below:

On the Title Page
Item [72], Inventor, Delete "David A Cooper", insert --David M. Cooper--

Signed and Sealed this
Fifteenth Day of September, 2020

Andrei Iancu
*Director of the United States Patent and Trademark Office*